US007734563B2

(12) United States Patent
Hart et al.

(10) Patent No.: US 7,734,563 B2
(45) Date of Patent: Jun. 8, 2010

(54) AUTOMATIC INVOCATION OF COMPUTATIONAL RESOURCES WITHOUT USER INTERVENTION ACROSS A NETWORK

(75) Inventors: Peter Hart, Menlo Park, CA (US); Jamey Graham, San Jose, CA (US)

(73) Assignee: Ricoh Company, Ltd. (JP)

( * ) Notice: Subject to any disclaimer, the term of this patent is extended or adjusted under 35 U.S.C. 154(b) by 513 days.

(21) Appl. No.: 10/462,017

(22) Filed: Jun. 13, 2003

(65) Prior Publication Data

US 2004/0073403 A1    Apr. 15, 2004

Related U.S. Application Data

(63) Continuation of application No. 09/916,158, filed on Jul. 25, 2001, now Pat. No. 6,633,861, which is a continuation of application No. 09/444,522, filed on Nov. 22, 1999, now Pat. No. 6,295,525, which is a continuation of application No. 08/923,619, filed on Sep. 4, 1997, now Pat. No. 6,049,792, which is a continuation-in-part of application No. 08/653,601, filed on May 24, 1996, now Pat. No. 6,041,182, which is a continuation of application No. 08/034,458, filed on Mar. 19, 1993, now Pat. No. 5,546,502.

(51) Int. Cl.
    *G06N 5/00* (2006.01)
(52) U.S. Cl. ........................................ 706/60; 706/45
(58) Field of Classification Search ................. 706/10, 706/11, 46, 47, 50, 60; 701/29; 714/26; 713/1
    See application file for complete search history.

(56) References Cited

U.S. PATENT DOCUMENTS 4,589,063 A    5/1986    Shah et al.
4,954,964 A    9/1990    Singh (Continued)

FOREIGN PATENT DOCUMENTS

EP    407 296 A1    1/1991
EP    436 459 A1    7/1991

(Continued)

OTHER PUBLICATIONS

Auerbach et al., "High-Level Language Support for Programming Distributed Systems Computer Language", Jan. 1992.

(Continued)

*Primary Examiner*—Wilbert L Starks, Jr.
(74) *Attorney, Agent, or Firm*—Townsend and Townsend and Crew LLP

(57) ABSTRACT

A system is described for automatically invoking computational resources without intervention or request from a user of the system. The computational resources may operate by searching across a network, or may themselves be located across a network. In the system a query-free information retrieval system is described in which the exact technical documentation contained in existing user or other technical manuals is provided to a user investigating apparatus having a fault. The user enters symptoms based upon the user's analysis of the apparatus, and in response the system provides information concerning likely faults with the apparatus. As the symptoms are entered, to relative value of individual faults is determined and related to the symptoms they cause. The user can then select technical information relating to probable faults in the system.

22 Claims, 11 Drawing Sheets

U.S. PATENT DOCUMENTS

| | | | |
|---|---|---|---|
| 5,060,150 A | 10/1991 | Simor | |
| 5,067,099 A | 11/1991 | McCown et al. | |
| 5,099,436 A | 3/1992 | McCown et al. | |
| 5,103,498 A | 4/1992 | Lainer et al. | |
| 5,159,685 A * | 10/1992 | Kung | 714/26 |
| 5,172,313 A | 12/1992 | Schumacher | |
| 5,263,126 A | 11/1993 | Chang | |
| 5,363,473 A | 11/1994 | Stolfo et al. | |
| 5,367,473 A | 11/1994 | Chu et al. | |
| 5,379,366 A | 1/1995 | Noyes | |
| 5,418,888 A | 5/1995 | Alden | |
| 5,432,932 A | 7/1995 | Chen et al. | |
| 5,442,791 A | 8/1995 | Wrabetz et al. | |
| 5,475,695 A | 12/1995 | Caywood et al. | |
| 5,485,615 A | 1/1996 | Wemmmyr | |
| 5,491,820 A | 2/1996 | Belove et al. | |
| 5,499,343 A | 3/1996 | Pettus | |
| 5,506,955 A | 4/1996 | Chen et al. | |
| 5,535,323 A | 7/1996 | Miller et al. | |
| 5,546,502 A * | 8/1996 | Hart et al. | 706/11 |
| 5,563,805 A | 10/1996 | Arbuckle et al. | |
| 5,572,643 A | 11/1996 | Judson | |
| 5,572,648 A | 11/1996 | Bibayan | |
| 5,594,910 A | 1/1997 | Filepp et al. | |
| 5,628,011 A | 5/1997 | Ahamed et al. | |
| 5,638,504 A | 6/1997 | Scott et al. | |
| 5,701,484 A | 12/1997 | Artsy | |
| 5,706,502 A | 1/1998 | Foley et al. | |
| 5,732,212 A | 3/1998 | Perholtz et al. | |
| 5,758,072 A | 5/1998 | Filepp et al. | |
| 5,793,933 A | 8/1998 | Iwamasa | |
| 5,875,306 A | 2/1999 | Bereiter | |
| 6,041,182 A * | 3/2000 | Hart et al. | 706/50 |
| 6,049,792 A * | 4/2000 | Hart et al. | 706/10 |
| 6,295,525 B1 * | 9/2001 | Hart et al. | 706/46 |
| 6,633,861 B2 * | 10/2003 | Hart et al. | 706/47 |
| 6,643,569 B2 * | 11/2003 | Miller et al. | 701/29 |
| 6,983,362 B1 * | 1/2006 | Kidder et al. | 713/1 |

FOREIGN PATENT DOCUMENTS

| | | |
|---|---|---|
| EP | 616 288 A2 | 9/1994 |
| JP | 62-137636 A | 6/1987 |
| JP | 02-029817 | 1/1990 |
| JP | 02-137684 A | 5/1990 |
| JP | 02-200048 | 8/1990 |
| JP | 03-005883 | 1/1991 |
| JP | 04-093721 A | 3/1992 |
| JP | 05-011953 | 1/1993 |
| JP | 05-028193 A | 2/1993 |
| JP | 05-035484 | 2/1993 |
| JP | 05-046662 A | 2/1993 |
| JP | 08-272572 | 10/1996 |
| WO | WO 92/02880 | 2/1992 |

OTHER PUBLICATIONS

Bellazzi et al., "GAMEES II An Environment for Building Probabilistic Expert Sys Based on Arrays of Bayesian Belief Networks," pp. 14-17, Jun. 1992.

Chen et al., "A Knowledge Based Approach to the Design of Document Based Retrival System", ACM, pp. 281-290.

De Paoli et al., "FLAME: A Language for Distributed Programming, Computer Languages," International Conference, pp. 69-78, Jan. 1990.

Elkin et al., "Closing the Loop on Diagnostic Decision Support Systems," *14th Annual Symposium on Computer Applications in Medical Care, Standards in Medical Informatics*, Washington, D.C., pp. 589-593 (1990).

Finke et al., "Distribution and Inheritance In the HERON Approach to Heterogeneous Computing; Distributed Computing Systems," Proceedings of the 13th International Conference on, p. 3, Jan. 1993.

Gunaseelan et al., "Distributed Eiffel: A Language for Programming Multi-Granular Distributed Objects on the Clouds Operating System," Computer Languages, Proceedings of the 1992 International Conference on, 1992, pp. 331-340, Jan. 1992.

Hueser et al., "Development of Distributed and Client/Server Object-Oriented Applications: Industry Solutions," Proceedings of the Ninth Annual Conference on Object-Oriented Programming Systems, Language, Oct. 1994.

Hopfield et al., "Neural Computation of Decisions in Optimization Problems," *Biological Cybernetics*, pp. 141-152.

Howell, K., "The Viability of Internet Advertising," pp. 1-2 and InfoPage [online], downloaded Jun. 7, 2000 from http://www.acs.ucalgary.ca/~dabrent/380/webproj/2howel.html.

Hudson et al., "Human-Computer Interaction in a Medical Decision Support System," *IEEE*, Jan. 1989.

Korel et al., "Assertion Oriented Automated Test Data Generation", *IEEE. Proc. of ICSE-18*, pp. 71-80.

Kramer et al., "A Constructive Approach to the Design of Distributed Systems," *Computing Systems*, Proceedings, 10th International Conference on, pp. 580-587, Jan. 1990.

Kramer et al., "A Constructive Approach to the Design of Distributed Systems, Building Distributed Systems", IEE Colloquium on, 1990, pp. 3/1-315, Jan. 1990.

Kramer et al., "Configuring Object-Based Distributed Programs in REX, Software Engineering Journal," vol. 7:2, pp. 139-149, Mar. 1992.

Menon et al., "Asynchronous Event Handling in Distributed Object-Based Systems," Distributed Computing Systems, Proceedings of the 13th International Conference on, pp. 383-390, Jan. 1993.

Moore et al., "Characterizing the Error Funcation of a Neural Network", *IEEE*, pp. 49-57 (1998).

Morjaria et al., "Modular Reliability Upgrade Option for Copiers or Printers," *Xerox Disclosure Journal*, 17(4):231-233 (Jul. 1992-Aug. 1992).

Ni et al., "Design of Network Application Protocols for Distributed Programming", Computer Networking Symposium, Proceedings of the, pp. 322-330, Jan. 1988.

Serbedzjia et al., "High-Level Real-Time Distributed Programming," Distributed Computing Systems, Proceedings of the Third Workshop on Future Trends of, 1992, pp. 72-78, Oct. 1994.

Shibata et al., "Dynamic Hypertext and Knowledge Agent System for Multimedia Information Networks", Hypertext Proceedings, pp. 82-93.

Shrivastava et al., "An Overview of the Arjuna Distributed Programming System," IEEE Software vol. 8 1, pp. 66-73, Jan. 1991.

Venkatesh, "Computer & Other Interactive Technologies for the Home," Comm. of the ACM, vol. 39, No. 12, pp. 47-54.

Wu, Z., "Making C ++ A Distributed Programming Language, Distributed Computing Systems," Proceedings of the Fourth Workshop on Future Trends of, pp. 228-233, Jan. 1993.

Yoelle et al., "An Information Retreival Approach for Automatically Constructing Software Libraries," *IEEE Transactions on Software Engineering*, vol. 17, No. 8, (1991).

Yung et al., "Design of a Distributed Programming Platform for Parallel Computation In A Network of Workstations," TENCON '92, "Technology Enabling Tomorrow: Computers, Communications and Automation Towards the 21st Century" IEEE Region, Jan. 1992.

Combined Search and Examination Report under Sections 17 and 18(3).

Proceedings of the Third Workshop on Future Trends of Distributed Computer Systems (Cat. No. 91TH0427-5), Distrbuted Computing Systems, 1992, Proceedings of the Third Workshop on Future Trends of, 1992, Jan. 1992.

"Walk The Talk. Targeted Advertising," Bits and Pixels: Targeted Advertising, www.bitpix.com/business/main/walk-talk/tad/tad.htm.

Office Action dated Nov. 29, 2006 for related Japanese case (document in Japanese).

Office Action dated Nov. 30, 2006 for related Japanese case (document in Japanese).

Japanese Office Action dated Oct. 30, 2007, for Japanese Application No. 2003-140280, 2 pages (Japanese language only, no translation).

Japanese Office Action dated Feb. 12, 2008, for Japanese Application No. 2006-028854, 2 pages (Japanese language only, no translation).

* cited by examiner

AUTOMATIC INVOCATION OF COMPUTATIONAL RESOURCES WITHOUT USER INTERVENTION ACROSS A NETWORK

STATEMENT OF RELATED APPLICATIONS

The present application is a continuation of U.S. patent application Ser. No. 09/916,158, filed Jul. 25, 2001, which is a continuation of U.S. patent application Ser. No. 09/444,522, filed Nov. 22, 1999 (which issued as U.S. Pat. No. 6,295,525 B1), which is a continuation of U.S. patent application Ser. No. 08/923,619, filed Sep. 4, 1997 (which issued as U.S. Pat. No. 6,049,792), which in turn is a continuation-in-part of U.S. patent application Ser. No. 08/653,601, filed May 24, 1996, (which issued as U.S. Pat. No. 6,041,182), which is a continuation of U.S. patent application Ser. No. 08/034,458, filed Mar. 19, 1993 (which issued as U.S. Pat. No. 5,546,502). The entire contents of all the above-identified applications are incorporated herein by reference for all purposes.

BACKGROUND OF THE INVENTION

This invention relates to expert systems, and in particular to a system in which computational resources are invoked by a user without direct intervention.

The increasing use of expert systems as diagnostic tools in service industries has established that knowledge embedded systems can provide quality expertise within defined domains. Most prior systems, however, do not appreciate the usefulness of technical documentation as a resource for human experts when performing diagnostic tasks. On-line technical manuals can aid the user by greatly enhancing the potential for success. Typical prior art systems which do recognize this asset simply provide interfaces for browsing on-line documentation in a "help text" format. This documentation, however, is usually the result of experts and developers rewriting, in an abbreviated form, the content of technical manuals. The exact technical documentation contained in the manuals, and used by most technicians in the field, is not provided. By rewriting the documentation, the experts and developers increase the time to develop a system, and decrease the original content. Because the documentation does not rely on the actual manuals, which are maintained independently, the life cycle costs of maintaining this "help text" documentation is high.

Some help systems have relied on expert systems to add "intelligence" to the help system. One such prior art system is described in U.S. Pat. No. 5,103,498, entitled "Intelligent Help System." In that system a monitoring device "watches" the system-user interface and determines what monitoring information to store. This information, together with the physical state of the system, is stored in a knowledge base. An inference engine tests rules against the knowledge base data to generate help text. Unfortunately, in this system the user must request help, and that help is supplied as help text.

A system applied specifically to the medical information field provided a method of automatic information retrieval by evaluating the observed manifestations and possible diagnosis. It then provided access to relevant medical texts. The system is described in P. L. Elkin, et al., "Closing the Loop on Diagnostic Decision Support Systems," 14th Annual Symposium on Computer Applns. in Medical Care, Standards in Medical Informatics, Washington, D.C. (November 1990), IEEE Computer Soc. Press. Unfortunately, the technical details of the system are still unclear.

Furthermore, in many prior art systems computational resources typically were, in a sense, turned "on" and "off" by the user. By this we mean that the user decided when to process particular information to determine interrelationships among all of the entered information. In such systems users are unaware of all of the capabilities of the system and thus often overlook valuable computational resources.

Another restriction of prior art systems is that they are restricted to locally available computational resources and do not take advantage of remote computational resources-available via a network.

SUMMARY OF THE INVENTION

The present invention provides a system which automatically invokes external computational resources without user intervention. In one embodiment, a base application, typically a computer program, is used interactively by a user. An agent monitors interactions between the user and a base application. As use progresses, a variety of internal calculations are performed by the agent based upon interactions between the user and the base application. When these calculations determine that additional information could be of benefit to the user based on the information entered, then the availability of that additional information is made known to the user. If the user desires the additional information, it can be displayed for review. Alternatively, the user can continue with analysis, reserving a review of the additional information for later. Preferably, in this system a belief network is employed to enable probabilistic or other determinations to be made of the likely importance of the information available.

A preferred system, according to the present invention employs an information retrieval method which, unlike prior systems, uses the exact technical documentation contained in the existing user or other technical manuals. It does not require the user to know of the existence of information to receive it. Furthermore, the system does not simply offer on-line access to help text, but instead provides contextual pointers (based on the context of the expert system) to the user manual documentation. Whereas most on-line information access systems require the user to enter a search query and request processing of that query when searching for relevant information, this system does not. The availability of relevant information is provided automatically or "query-free" as the user works on a diagnostic problem. This is achieved by evaluating the context of the diagnostic session and automatically accessing the appropriate technical documentation. Additionally, the text provided when it is requested is that of the user manuals—text with which the user is already familiar. Any updates to the hard copy documentation can be electronically uploaded into this system, so the hard copy and electronic copy of the manual are always consistent.

In a preferred embodiment, an information retrieval system which employs the present invention includes a computing system in which is stored documentation relating to the apparatus to be investigated as well as probabilistic information relating individual symptoms to faults in the apparatus which may cause such symptoms. The user of the system employs some means of data entry, typically a keyboard to select from a menu on a screen, to allow the user to enter symptoms concerning the apparatus being investigated. In response, the system calculates probabilities of the individual faults as indicated by the symptoms they cause. The possible faults are displayed, and the user is given an opportunity to select documentation related to the possible faults.

In one embodiment, one or more of the base application, computational resource, and agent are located on a computer system remote from the user. Also, the agent may query multiple computational resources via a network.

A further understanding of the nature and advantages of the inventions herein may be realized by reference to the remaining portions of the specification and the attached drawings.

DESCRIPTION OF SPECIFIC EMBODIMENTS

Figure 1:
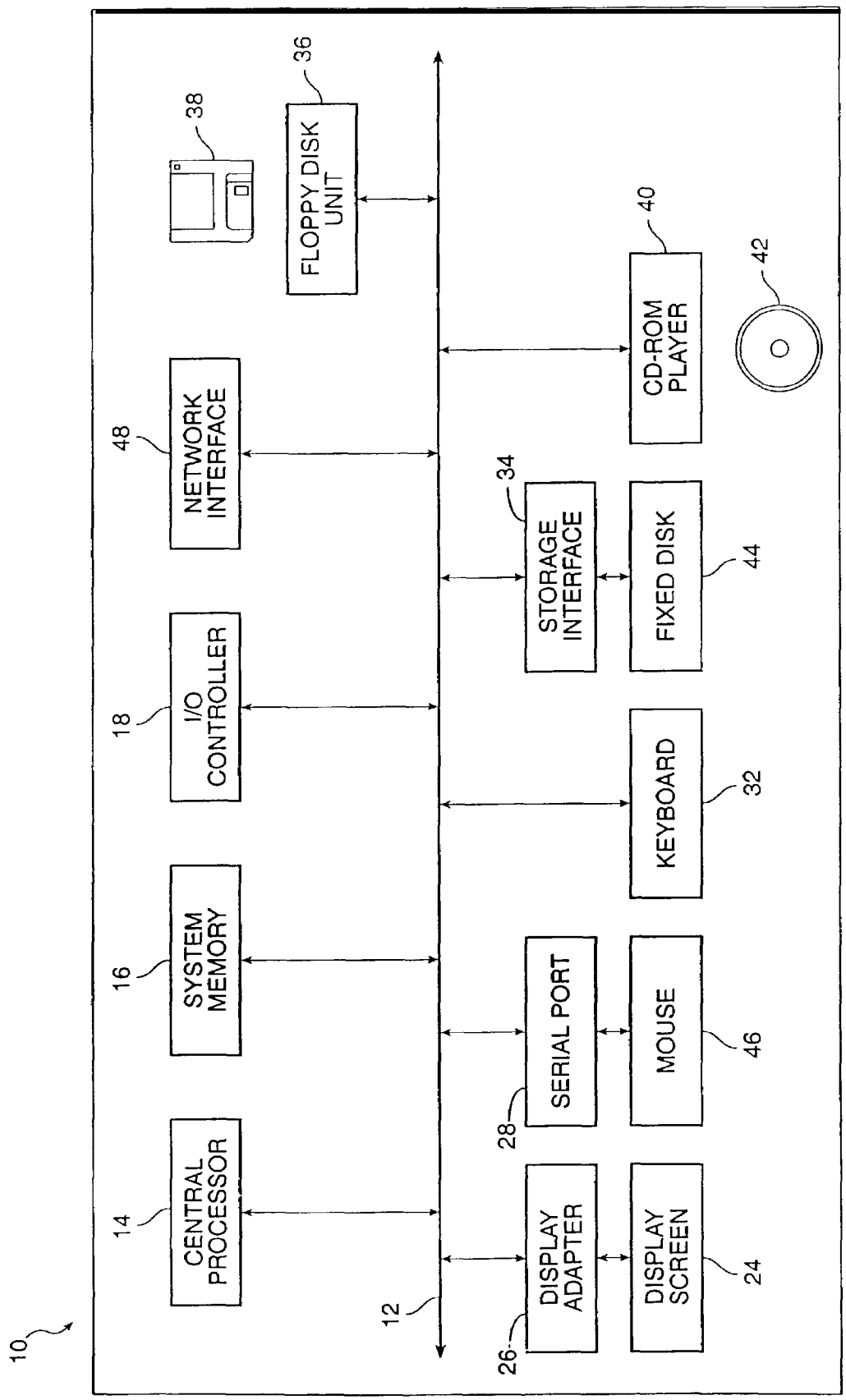
FIG. 1 depicts a computer system suitable for implementing one embodiment of the present invention.

FIG. 1 depicts a computer system 10 suitable for implementing one embodiment of the present invention. FIG. 1 depicts a block diagram of a local computer system 10 suitable for implementing the present invention. Local computer system 10 includes a bus 12 which interconnects major subsystems such as a central processor 14, a system memory 16 (typically RAM), an input/output (I/O) controller 18, an external device such as a display screen 24 via a display adapter 26, a serial port 28, a keyboard 32, a storage interface 34, a floppy disk drive 36 operative to receive a floppy disk 38, and a CD-ROM player 40 operative to receive a CD-ROM 42. Storage interface 34 may connect to a fixed disk drive 44. Many other devices can be connected such as a mouse 46 connected via serial port 28 and a network interface 48. Network interface 48 may provide a connection to a local network and/or the Internet. Many other devices or subsystems (not shown) may be connected in a similar manner.

Also, it is not necessary for all of the devices shown in FIG. 1 to be present to practice the present invention, as discussed below. The devices and subsystems may be interconnected in different ways from that shown in FIG. 1. The operation of a computer system such as that shown in FIG. 1 is readily known in the art and is not discussed in detail in this application. Code to implement the present invention may be operably disposed or stored in computer-readable storage media such as system memory 16, fixed disk 44, or floppy disk 38.

Figure 2:
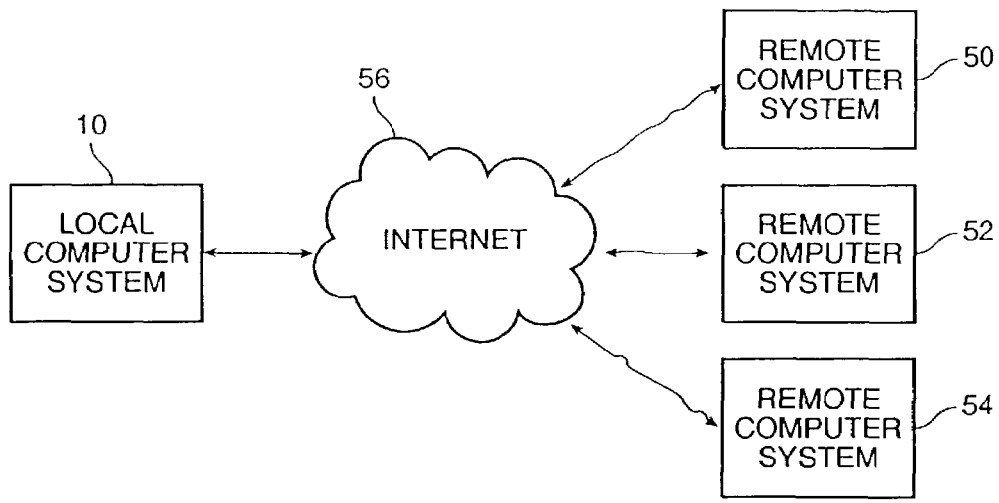
FIG. 2 depicts a representative computer network suitable for implementing one embodiment of the present invention.

FIG. 2 depicts the interconnection of local computer system 10 to remote systems 50, 52, and 54 which may have a structure similar to local computer system 10. FIG. 2 depicts the Internet 56 interconnecting client systems 50, 52, and 54. Network interface 48 provides the connection from local computer system 10 to the Internet 56. Although FIG. 2 depicts the use of the Internet for exchanging data, the present invention is not limited to the Internet.

Figure 3:
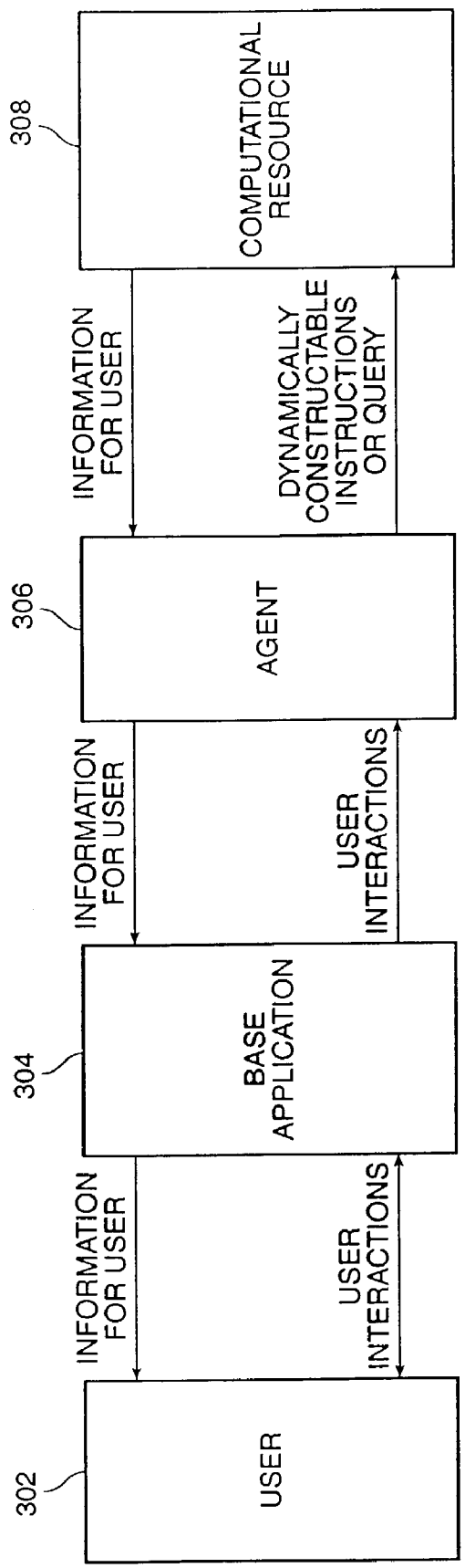
FIG. 3 is a diagram representing the relationship of a computational resource, a base application, and an agent that performs computations responsive to a context defined by user interactions with the base application in accordance with one embodiment of the present invention.

FIG. 3 is a diagram representing the relationship of a computational resource, a base application, and an agent that performs computations responsive to a context defined by user interactions with the base application in accordance with one embodiment of the present invention. A user 302 interacts with a base application 304. User 302 need not be a human user and could be, e.g., another computer program. Base application 304 could be, e.g., a word processor, a spreadsheet program, an expert system, etc. The user interactions are monitored by an agent 306.

Agent 306 uses the monitored interactions to establish a context and computes an instruction in real time to a computational resource 308. In one embodiment, the instruction is a query to computational resource 308 for information which would be relevant to the user. Computational resource 308 typically will be an information retrieval system, a database or other possible provider of useful information or a performer of some function.

Through the action of agent 306, computational resource 308 is automatically invoked without specific user intervention. Agent 306 may be implemented in many ways and may be as complex as either base application 304 or computational resource 308. For example, agent 306 may include several belief networks giving it the capability of making complex decisions about how to instruct computational resource 308, or even how to select computational resource 308 from among multiple alternatives.

Once computational resource 308 executes a received instruction, it returns the result to agent 306. Agent 306 presents the result to user 302 through base application 304. In an alternative embodiment, agent 306 presents the results directly. Another alternative is for computational resource 308 to present the result to user 302 via base application 304 without going through agent 306. The result may be, e.g., a search result from a query or information about the availability of other information.

One or more of base application 304, agent 306, and computational resource 308 may be combined within the same executable modules. Message passing is the preferred communication method among those of base application 304, agent 306, and computational resource 308 that are within the same executable module. In the context of a Microsoft® Windows operating system environment, between those entities that are ".exe" files, DDE (Dynamic Data Exchange) is the preferred method of communication. If one executable entity is an ".exe" and another executable entity is a DLL (Dynamic Link Library) then DLL is the preferred method of communication.

Preferably as use of base application 304 progresses interactively, internal calculations are made based upon the input information entered by the user. When these calculations determine that further information could be of benefit to the user, then the availability of that further information is made known. In effect the user interactions have established a context by which computational resource 308 can return relevant information or perform actions. Because, in the preferred embodiment, the availability of the information is only made known to the user, as opposed to being displayed to him, the user can choose to continue with the analysis or project, reserving a review of the information until later.

Preferably, this system functions in the probabilistic expert system environment known as belief networks. The use of belief networks for assessing one's belief about a set of circumstances is a technique which has gained popularity in the last few years in the field of expert systems. The technique represents an expert's knowledge by assigning a conditional probability to the relationship between a symptom and a fault, or more generally between a cause and an effect. In such systems, by evaluating when or how a symptom occurs with respect to all possible faults which can cause it, the expert system can provide a probabilistic assessment of this relationship. For example, if the relationship between the symptom "streaky copy" and the fault "toner clutch failure," is "strong" then the likelihood (probability) is high that this fault is present once this symptom is observed. In a belief network environment, experts and developers assign probabilistic values to the relationship which exists between each individual symptoms and all faults F, i.e., $P(S_1|F_1, F_2, \ldots, F_n)$. At runtime, these probabilities are inverted using Bayes' rule to represent a fault with respect to the symptoms it causes, e.g., $P(F_1|S_1, S_2, \ldots, S_n)$. Thus, as a user observes and enters known symptoms, the relative value of the individual faults which are supported by these symptoms goes up, eliminating irrelevant faults from the overall diagnosis.

The structure of the belief network in this system is represented by symptoms or observed features connected to the faults or hypotheses which cause them. These network nodes (both symptoms and faults) provide the content for the information retrieval system. The software used in the preferred embodiment to achieve this relationship is known as DXpress and is commercially available from Knowledge Industries, Palo Alto, Calif.

Although here we use the terms "fault" and "symptom," it should be understood they are used solely for explanation. Other equivalent terminology may be readily employed, for example, condition and manifestation, state of nature and observation, etc. The use of fault and symptom is particularly convenient because in the preferred embodiment this system is used by repair technicians to diagnose and repair apparatus.

Figure 4:
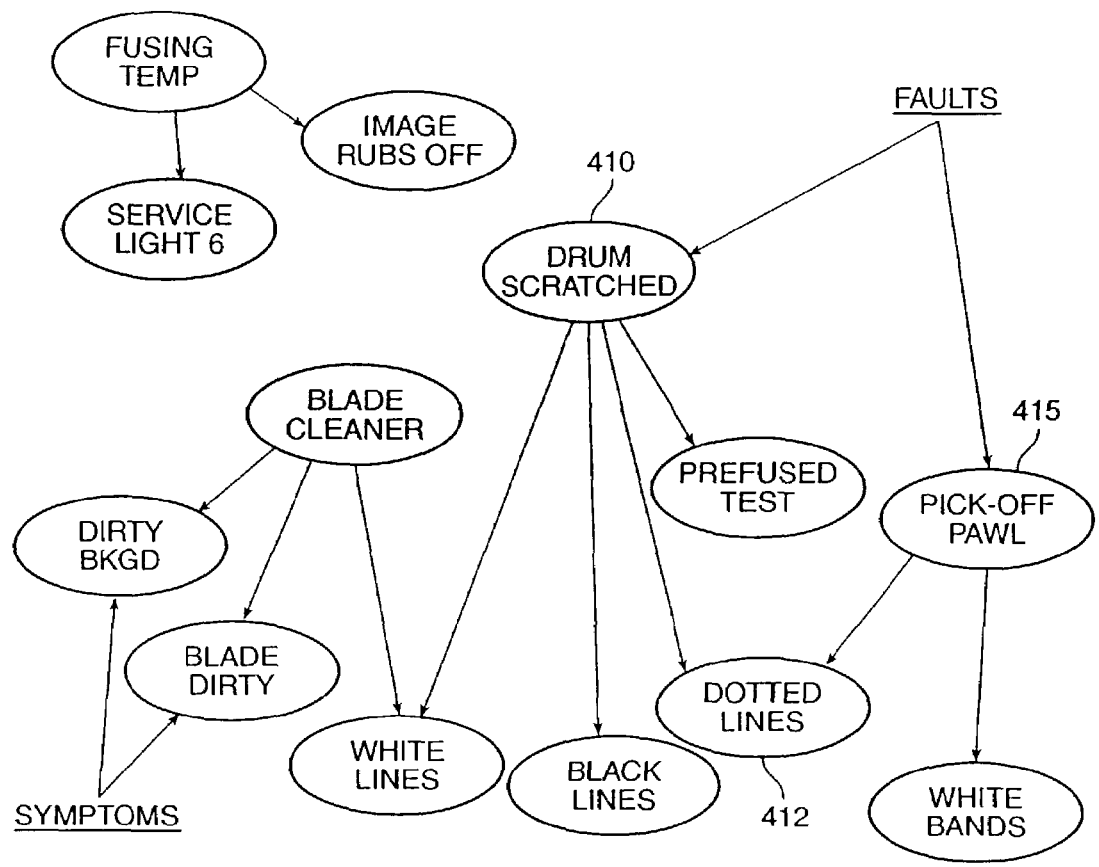
FIG. 4 is a chart illustrating a sample belief network which interrelates faults and symptoms in a system in accordance with one embodiment of the present invention.

FIG. 4 is a diagram illustrating a typical relationship of faults and symptoms. For illustration, the faults and symptoms chosen relate to a photocopier repair/adjustment context, such as might be employed in conjunction with the system of the present invention. As shown in FIG. 4, each fault can be related to more than one symptom, and each symptom to more than one fault. For example, the fault of a scratched drum 410 can cause many different symptoms, including dotted lines 412. Dotted lines, however, can also be caused by a faulty pick-off pawl 415. Of course, only a few faults and a few symptoms are shown in FIG. 4. An actual belief network will be much larger than that shown in FIG. 4, often including hundreds of faults and symptoms interrelated in a complex arrangement.

The structure of FIG. 4 in the larger system is developed by discussion between the expert and the software developer. At that time individual probabilities are assigned to the relationships which exist between each individual symptom and all faults. For example, the expert and software developer may decide that when dotted lines 412 occur, there is a one-third probability that it is due to a faulty pick-off pawl 415 and a two-thirds probability that it is due to a scratched drum 410. These probabilistic assessments are used in this information retrieval system to identify faults and symptoms, and provide resulting documentation to system users.

During a diagnostic session, the user enters observed symptoms into the expert system, thus making the symptoms active for the current session. As a result, in a manner described below, technical documentation pertaining to these symptoms becomes available for the user to browse through. The faults supported by these symptoms, that is, the faults which cause these symptoms to occur, also become active when there is enough justification, via the observed symptoms, to promote their individual likelihoods. When this occurs, technical documentation for the individual faults is also made available.

By recommending only the technical documentation pertaining to the active symptoms and faults, the system provides only the most relevant textual information of the current context of the diagnostic session. All other documentation is available for the user to browse through, but not recommended by the system. The present invention also provides a method of offering a more context-specific set of documentation for individual active faults by intersecting the topics from the supporting symptoms (i.e., the symptoms which have helped increase an individual fault's likelihood) and the fault. The result is a set of topics more specific in their depiction of the current diagnosis.

By exploiting the belief network system at development time, one embodiment of the present invention is able to use the content of the network to locate relevant documentation to be offered at runtime. At runtime, the active nodes and their alliances are exploited to provide more relevant documentation at the appropriate stages during a diagnostic session.

Although other methods can be used, in a preferred embodiment, the appropriate information is retrieved based on the user manual table of contents method. This method is described in detail in commonly assigned U.S. Pat. No. 5,331,554, entitled "Method and Apparatus for Semantic Pattern Matching for Text Retrieval," the contents of which are herein incorporated by reference. The table of contents method has several advantages over comparable systems. First, the table of contents system uses natural language understanding techniques and a unique method of propagating the context of topics to provide a better search strategy in user manual texts. Second, this system provides the user with a structured set of fundamental manual topics which relate both to the individual concepts active in the expert system and to the combined context of concepts addressing the same diagnostic goal. As a result, the content of the information available is richer and more useful to the user. Lastly, the probabilistic approach for the expert system provides a natural method of evaluating what is currently important in the system and what observed items support those important concepts. Because of this, this system offers a more complete and reliable set of documentation to support the current diagnosis.

Although other types of natural language under-standing systems may seem to be better solutions to inter-facing with computers, other systems have definite limitations which inhibit their overall functionality. Such types of natural language understanding technology have not matured enough to be an effective tool in the electronic servicing field where small, inexpensive computers are still a requirement. The preferred table of contents system provides an interface for entering and searching for relevant information in a user manual domain. Of course, although the table of contents approach is preferred, either type of system could be used in accordance with the present invention, particularly as the natural language technology advances.

This information retrieval system uses input from the belief network environment. Because the belief network is generated by experts and developers as they construct individual nodes, this system provides a controlled input scheme where experts and developers (familiar with the technical documentation) create the actual English search patterns. The developers are also responsible for making use of the table of contents database which consists of all relevant topics from the user manual, typically depicted by the original table of contents of the user manual. The database is then converted, using well known techniques and a natural language understanding system, into a semantically defined database, where each topic is in the form of a semantic representation, enabling searching for semantic similarities.

The benefits of simplifying how this system is used in this environment are several. First, this system eliminates the user having to construct a query and the system having to understand it. Typically, the user of this system never stops to enter a query. The appropriate query has already been constructed and parsed, and the relevant information retrieved. Second, this system generally eliminates the parse failures which commonly occur when users attempt to construct queries directly. Finally, this system simplifies the process of matching queries and table of contents topics. Because the system is well defined in terms of how topics and queries are parsed and represented, the matching becomes simpler.

In addition to furnishing the user with query-free information retrieval, this system provides a method of browsing the user documentation such as the table of contents or relevant subsections. Thus, the user is equipped with the appropriate tools for locating and using the on-line technical documentation.

As an example of how this system operates in the field, consider how an expert information retrieval system could be used by a photocopier field service technician: A copier technician has connected his laptop computer to a customer's copier. The customer has complained of streaky black lines appearing on all copies made recently. The technician loads the copier diagnostics program and starts to enter, by selecting from a menu, the known symptoms the copier has displayed. As he enters the first few symptoms, the system notifies him of the documentation available based upon both the symptoms and the most probable faults. The technician immediately pursues the documentation on the leading fault candidate to determine if there is any additional information which may confirm or discount this fault. He also views the documentation of an observed symptom knowing that it can be caused by several different faults and not just the leading fault candidate. In effect the user has invoked a query-free information database (computational resource 308) without directly requesting such.

In the preceding example, the technician is provided with an interface to an expert's knowledge of copiers as well as technical documentation, which supplements the overall capability of the expert system. Furthermore, the documentation is provided automatically for the technician, without him having to ask the system for additional information. The system knows the current context of the diagnoses and simply responds with the appropriate documentation.

The concept of providing query-free information retrieval in any domain is a favorable solution to dealing with query languages, natural or otherwise, which either fail to fully represent a query goal or fail in their ability to handle complex query statements. This system provides relevant documentation for the current context without the user having to formulate a query and wait for the results. To simplify the process of creating node labels used as search patterns, the preferred embodiment takes advantage of the structure of the expert system which is usually closely related to the documentation used to describe the domain. Thus, the preferred embodiment benefits from the structure of the expert system by providing contextual pointers to relevant user manual information.

The preferred embodiment extracts the belief network information, such as shown in FIG. 4 and processes it through an information retrieval system. The information retrieval system uses the information from within each node to form a pattern for searching user manual documentation. The results of the search are a set of topics which relate to the contents of the node.

Figure 5:
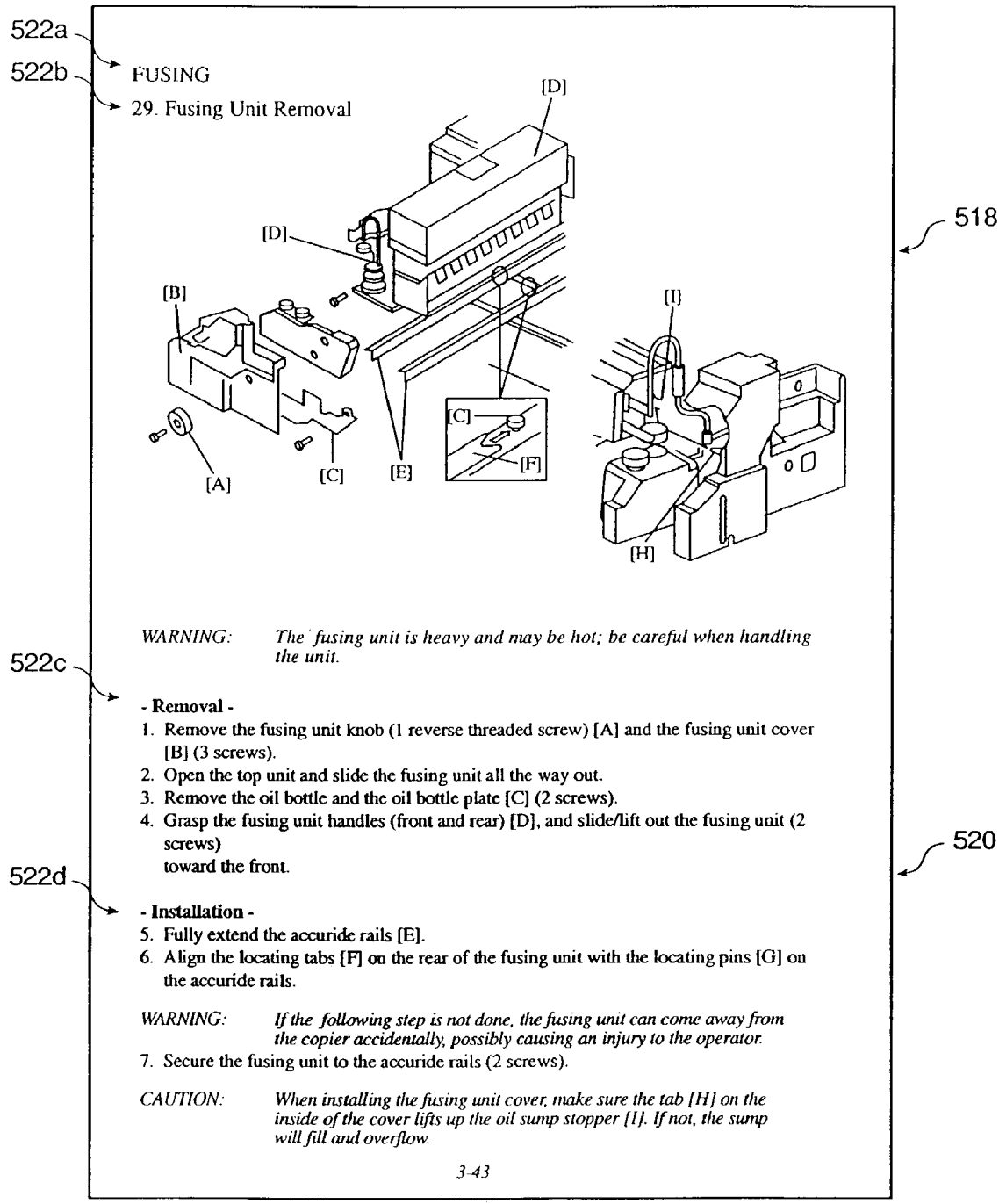
FIG. 5 illustrates typical user manual documentation, for example, for removal of a fusing unit in a photocopier in accordance with one embodiment of the present invention.

FIG. 5 is an example of user manual documentation. As shown in FIG. 5, a typical user manual includes drawings, such as in the upper portion 518 of FIG. 5 and text such as in the lower portion 520 of FIG. 5. The topical information shown in FIG. 5 is used for information retrieval as described below. Both the drawings and the descriptive text include topics 522a, 522b, 522c and 522d.

After performing the information retrieval, the system presents topics relevant to the current diagnostic session. For instance, if the current expert system context is "Drum Damage," then the system should not recommend documentation on the "Transfer Corona." The solution to this problem is to evaluate what nodes are currently important and only offer their documentation to the user. This is described below.

The information found by the information retrieval system is made available differently for the symptoms than for the faults. As symptoms are entered by a user, the documentation found by the information retrieval system is made available to the user on request. For instance, if a user enters a symptom into the system and supplemental documentation is available for this symptom, an icon appears next to the symptom (in the list of observed symptoms) denoting the availability of documentation. The user may also request to view the documentation of an unobserved (uninstantiated) symptom. This is done, for instance, in cases where the user requires additional information about a symptom prior to instantiation.

Determining when to provide the supplemental fault documentation is more difficult. Faults in the runtime system are presented as a ranked list based on their individual conditional probabilities given all symptoms observed thus far. Because the top contenders appear at the top of the list, the user is able to distinguish between the real contenders and the low probability faults which have little significance under the current set of circumstances. It is for this reason that this system targets only the top contenders to provide automatic documentation for the faults.

The preferred embodiment defines an activation predicate (AP) by which the system decides whether a fault is part of the "active" set of top contenders. The predicate is designed to locate the current set of top fault contenders. These contenders can change after each instantiation of new symptoms. In the belief network system, the combined sum of fault probabilities is always 1.0. Thus, each time a new symptom is recorded, the faults which have a strong relationship with this symptom will increase in likelihood. When their values increase, other fault values decrease so that all fault probabilities continue to sum to 1.0.

Each fault can have a positive, negative or neutral reaction. The positive reaction to the instantiation of a new symptom defines support by the symptom for the fault. A negative reaction typically defines non-support, but may not take the fault out of contention. For most systems, the neutral reaction is the most typical reaction because of the number of faults and their association with that symptom: the most likely situation is that only a few faults have a significant relationship with an individual symptom. Essentially, the activation predicate eliminates irrelevant faults by using a threshold value of 0.03 (or other desired value). All faults having a probability of 0.03 or greater are considered top contenders. These contenders are the only faults which will signal the user that documentation is available. Of course, other criteria could readily be used in place of a fixed threshold.

Thus far, the discussion has explained providing user manual documentation for individual nodes, not taking into account possible relationships in the documentation between fault and symptom nodes. In fact, the nodes which do "intersect" in the user manual documentation are considered the primary objective because an intersection defines a richer description of the current expert system context—the context between that of a diagnostic session in which, for instance, a symptom and a fault both share a common topic. The user likely will find the content of this information more relevant than information describing only individual nodes.

For example, assume a situation exists where there are four observed symptoms and five top contender faults. The most relevant documentation would be the documentation which connects symptoms and faults, for example, fault-A connected to symptom-2. By defining a support structure which depicts the symptoms and their relative support for contender faults, the system determines which symptoms support individual faults. Thus, it can perform a simple set intersection of the topics from each node in the support structure and produce a rich set of topics with relations to more than one node. This set is called the primary topic set. The set of topics having only a relation to an individual node is referred to as the secondary topic set.

To produce a primary topic set for a top contender fault, it is necessary to define what it means to be a member of a fault's support group. This is done by the support group predicate (SGP). The support group predicate evaluates each member of the top contender set each time a new symptom is observed. This process is very similar to that of taking a before-and-after snapshot of the entire fault set. The after fault "snapshot" is compared to the before fault "snapshot" and differences noted by examining which faults were most directly influenced by the new observable. In other words, those faults which had the strongest reactions to the new observable are determined.

The support group predicate is based on a $\Delta P_{ij}$ matrix. The $\Delta P_{ij}$ matrix represents the difference between the probability of each fault before and after a new symptom was entered. If the difference is significant enough, then there is a correlation between the symptom and the fault (a reaction). The diagram below defines $\Delta P_{ij}$ and the resulting matrix. The symptoms represented are only those symptoms which are active for the current session. These are the only nodes evaluated when measuring the strength of support, nonsupport or neutrality at each instantiation.

$F=(F_1, \ldots, F_m)$ is the set of all active faults. $S=(S_1, \ldots, S_j)$ is the set of all active symptoms, and $\alpha$=support group threshold is the desired threshold. For $F_i$ in F, the goal is to find $\Delta P_{ij}$ where $S_j$ is the latest observed symptom $\Delta P_{ij}=P(F_i|S_1, \ldots, S_j)-P(F_i|S_1, \ldots, S_{j-1})$ If $\Delta P_{ij}>\alpha$, then ADD $S_j$ to the $F_i$ support group $SG_i$. (Preferably, $\alpha=0.01$.)

$\Delta P_{ij}$ Matrix

Observed Symptoms $S_1, S_2, \ldots, S_j$ $$\text{Faults} \begin{array}{c} F_1 \\ F_2 \\ \ldots \\ F_i \\ \ldots \\ F_m \end{array} \left[ \begin{array}{ccc} & & \vdots \\ & & \\ \cdots & & \Delta P_{ij} \\ & & \end{array} \right]$$

Figure 6:
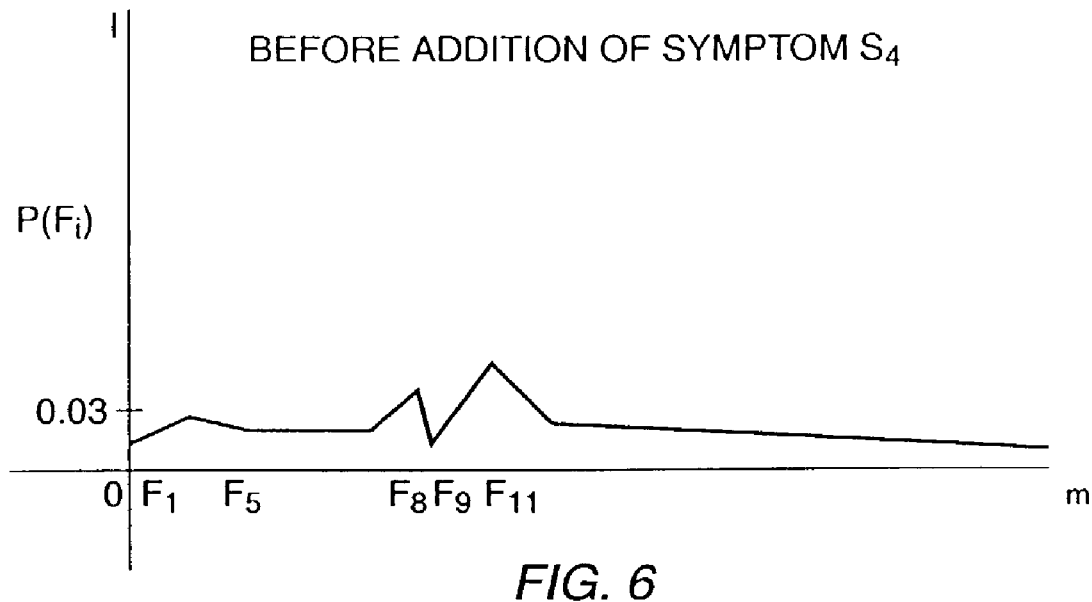
FIG. 6 is a graph illustrate the probability of various faults with the apparatus being investigated before introduction of a new symptom in accordance with one embodiment of the present invention.

FIG. 6 is a graph which illustrates the individual probabilities of a series of faults based upon a set of symptoms entered into this system at a given time. Note that the sum of the probabilities of all faults must be 1.0. At the instant of the graph in FIG. 6, faults $F_8$ and $F_{11}$ are the top two contending faults as being likely to have caused the symptoms entered into the system up to that time.

Figure 7:
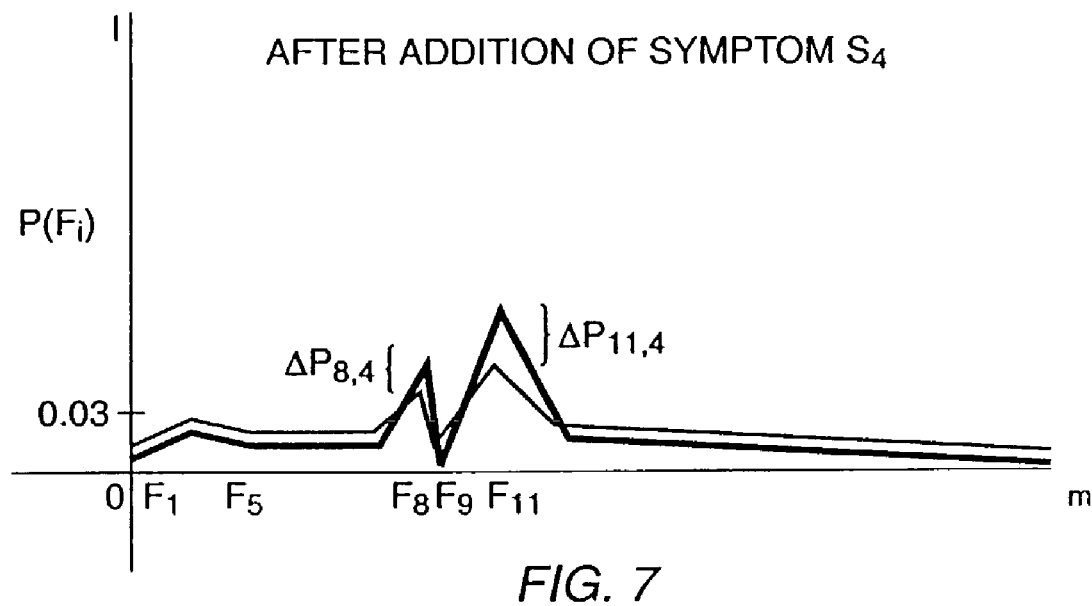
FIG. 7 is a chart illustrating the change in probabilities after introduction of a new symptom in accordance with one embodiment of the present invention.

FIG. 7 illustrates what occurs after an additional symptom $S_4$ is entered into the system. The addition of symptom $S_4$ increases the probabilities of $F_8$ and $F_{11}$ while decreasing the probabilities of all other faults, yet retaining a sum of 1.0. This represents an example of how the $\Delta P_{ij}$ (snapshot) method evaluates the results of introduction of a new symptom. Notice the increase in probability in faults $F_8$ and $F_{11}$. As their value increases, the value of the other, less relevant, faults decreases. The $\Delta P_{ij}$ represents the gap between the previous fault probability value and the value after $S_4$ has been observed.

If it is decided that a fault has been influenced (either positively or negatively) by the new symptom, then the symptom becomes a member of the fault's support group. After each new symptom instantiation, all modified support groups are evaluated, producing a new set of primary topics for the user to view in the manner explained below.

Figure 8:
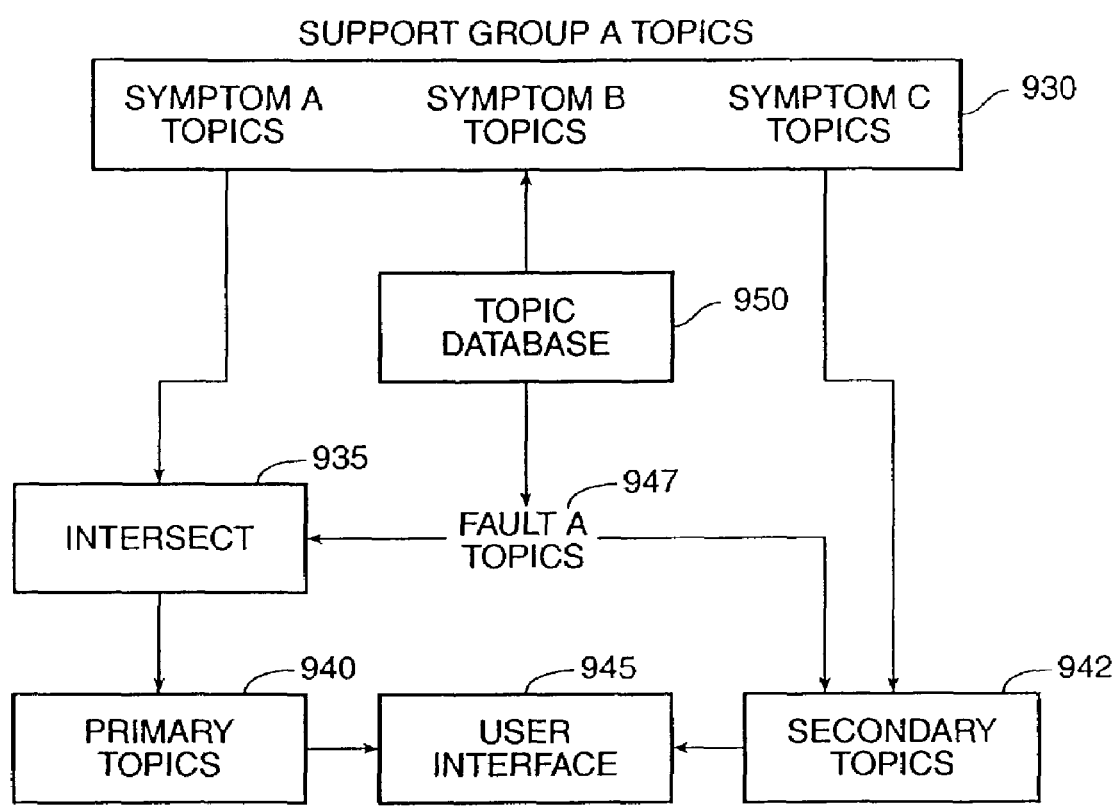
FIG. 8 is a flowchart illustrating the relationship of primary and secondary topics in accordance with one embodiment of the present invention.

FIG. 8 is a chart displaying the operation of the system with respect to primary and secondary topics. As shown in FIG. 8, symptoms A, B and C have been entered 930. These symptoms have been entered through the user interface in a manner which is described below. The symptoms, for the sake of this example, are members of a particular fault's support group (fault A), in the sense of being related to each other as described in conjunction with FIGS. 7 and 8. As a result, the symptoms intersect 935 to establish primary topics 940 which are likely of most interest to the user. Where the symptoms do not so relate to each other as being within a given fault support group, secondary topics 942 occur which are less well-focused than the primary topics but are still of interest to the user, and are available to the user. In response to this information, the user may employ the user interface 945 to select documentation on the primary or secondary fault A topics 947 available from the topic database 950.

Figure 9:
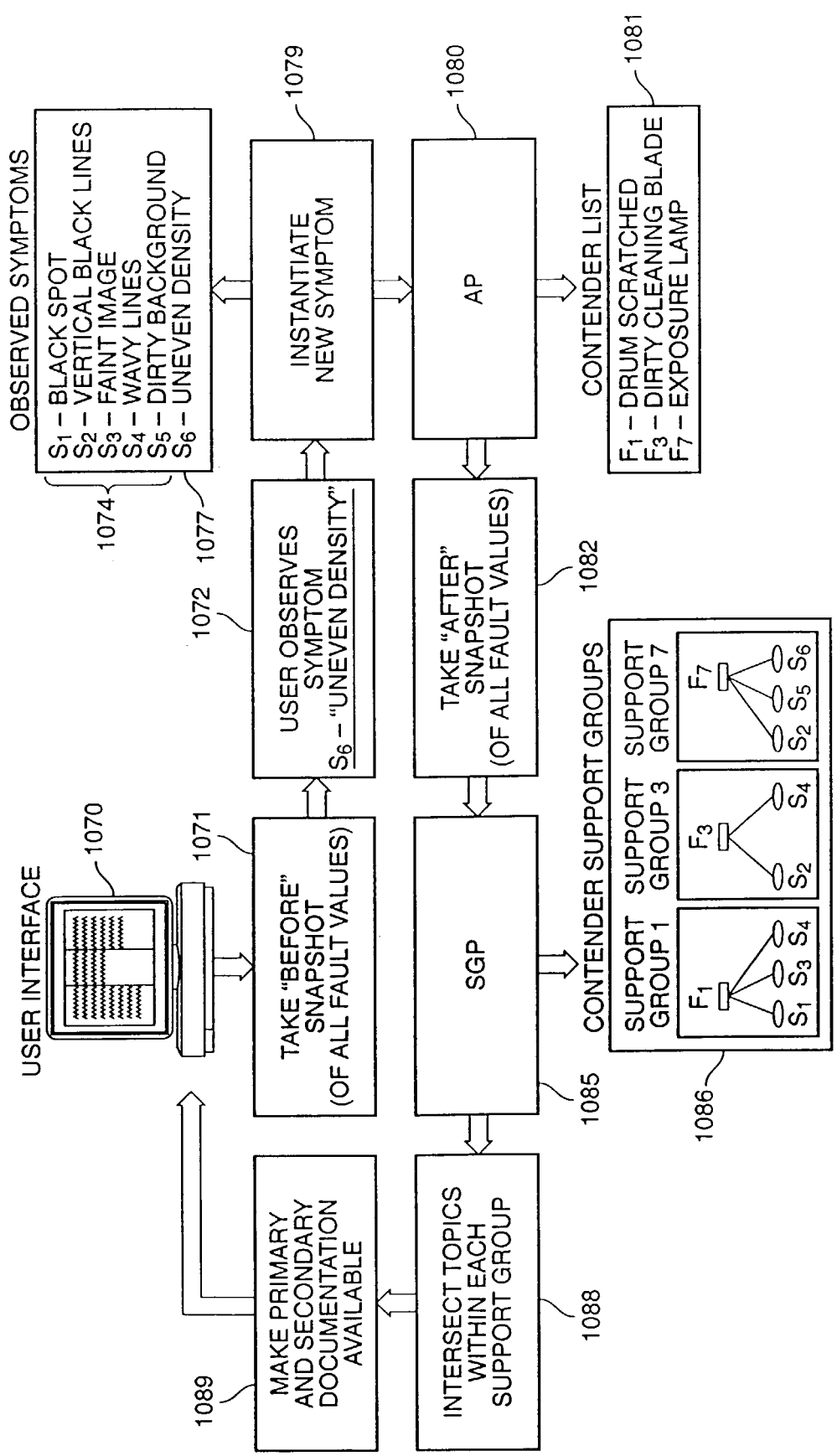
FIG. 9 is a chart depicting the process of determining support groups and a top contenders list in accordance with one embodiment of the present invention.

FIG. 9 is a diagram illustrating how both the activation predicate and the support group predicate fit into the existing runtime environment to provide automatic documentation recommendations. In FIG. 9, the dark arrows represent flow and the open arrows represent output from the system. The figure illustrates how through the user interface 1070 a "before" snapshot 1071 is presented of all fault values prior to the entry of the newest symptom 1072. In the case of FIG. 9, the previous symptoms 1074 consist of symptoms $S_1$ through $S_5$ which have been observed. The probabilistic information for these symptoms is presented in the manner described above.

Next, the user observes the new symptom 1077, for example, uneven copy density, termed symptom $S_6$. The instantiation 1079 of this new symptom is added to the list of observed symptoms 1074 and transferred to the activation predicate 1080. The activation predicate 1080 maintains the contender list 1081 of the most likely faults to cause the observed symptoms. It also provides an "after" snapshot 1082 of all fault values. These values are used by the support group predicate 1085 to maintain contender support groups 1086 and to intersect the topics 1088 within each support group thereby to make primary and secondary documentation 1089 available through the user interface.

Figure 10:
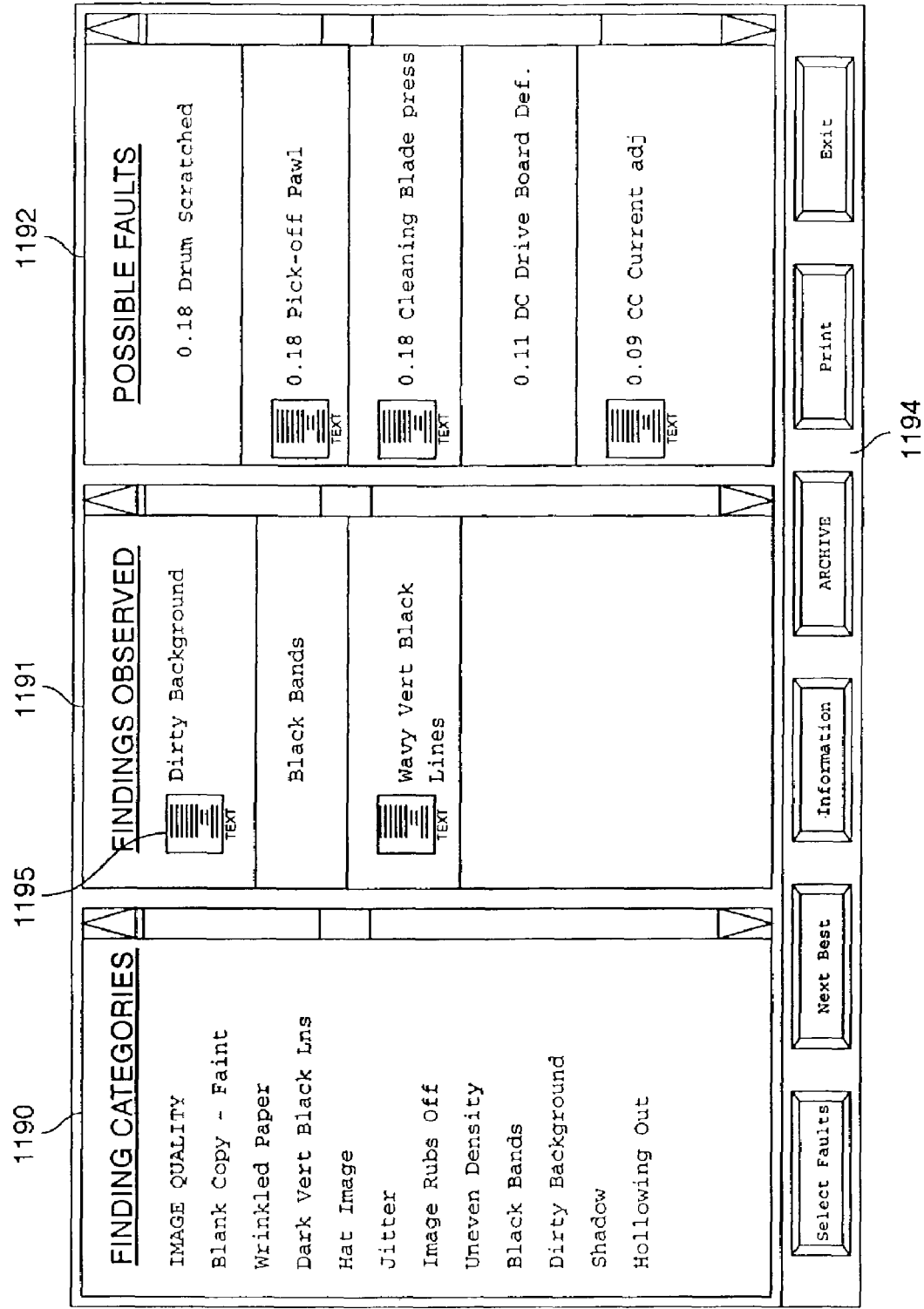
FIG. 10 is a drawing illustrating a typical user interface—in accordance with one embodiment of the present invention.

FIG. 10 is a diagram depicting a preferred embodiment of the user interface of the system. The user interface, in this embodiment, includes three windows 1190, 1191 and 1192, one 1190 relating to categories of possible findings by the user, one 1191 relating to the user's observations, and one 1192 listing the leading fault candidates based upon the probabilities established in the belief network. The first window represents the symptoms available in this category for the user to select. The middle window 1191 represents the observed symptoms. In the last window 1192 is the list of faults and their current probabilities based on all symptoms entered. Also provided are a series of graphical "push buttons" 1194 to enable the user to select other menus or screens where textural or descriptive information is available, that fact is indicated by an icon 1195 which the user may select.

Figure 11:
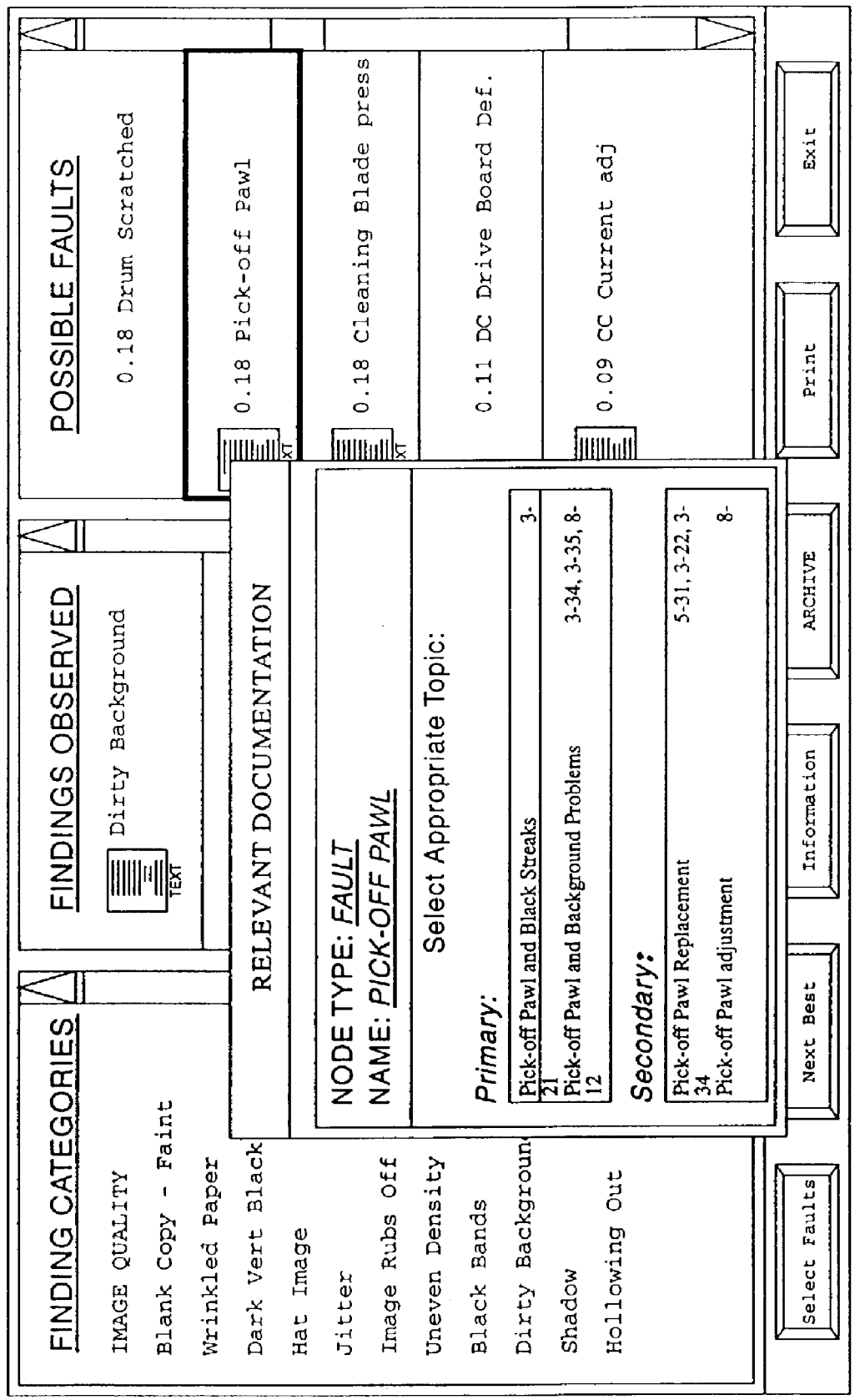
FIG. 11 is a drawing illustrating the selection of primary or secondary information in accordance with one embodiment of the present invention.

FIG. 11 depicts a situation where the user has asked, for example, by "clicking" on the box marked text, to view the documentation for the Pick-off Pawl fault. As shown, the user is presented with lists of both the primary and secondary topics. Once the user has decided which topic to view (e.g., "Pick-off Pawl Replacement"), the user interface provides a way of browsing from this point of contact. That is, the relevant topic is simply an entry point into the documentation based on a specific content. From there, the user typically will browse in the surrounding textual or illustrative areas searching for key information. (Typical documentation is shown in FIG. 5.)

Figure 12:
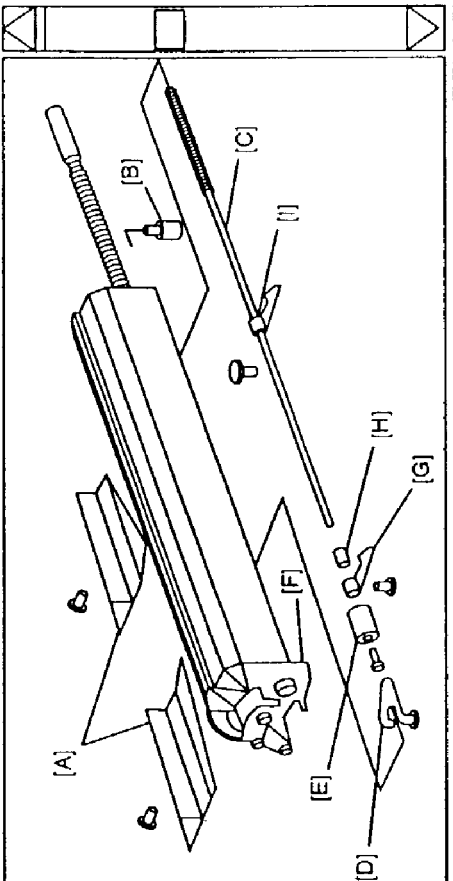
FIG. 12 is a drawing illustrating the display of on-line technical information in accordance with one embodiment of the present invention.

FIG. 12 illustrates the user interface provided for the user to actively browse through the documentation once a point of entry is established.

Figure 13:
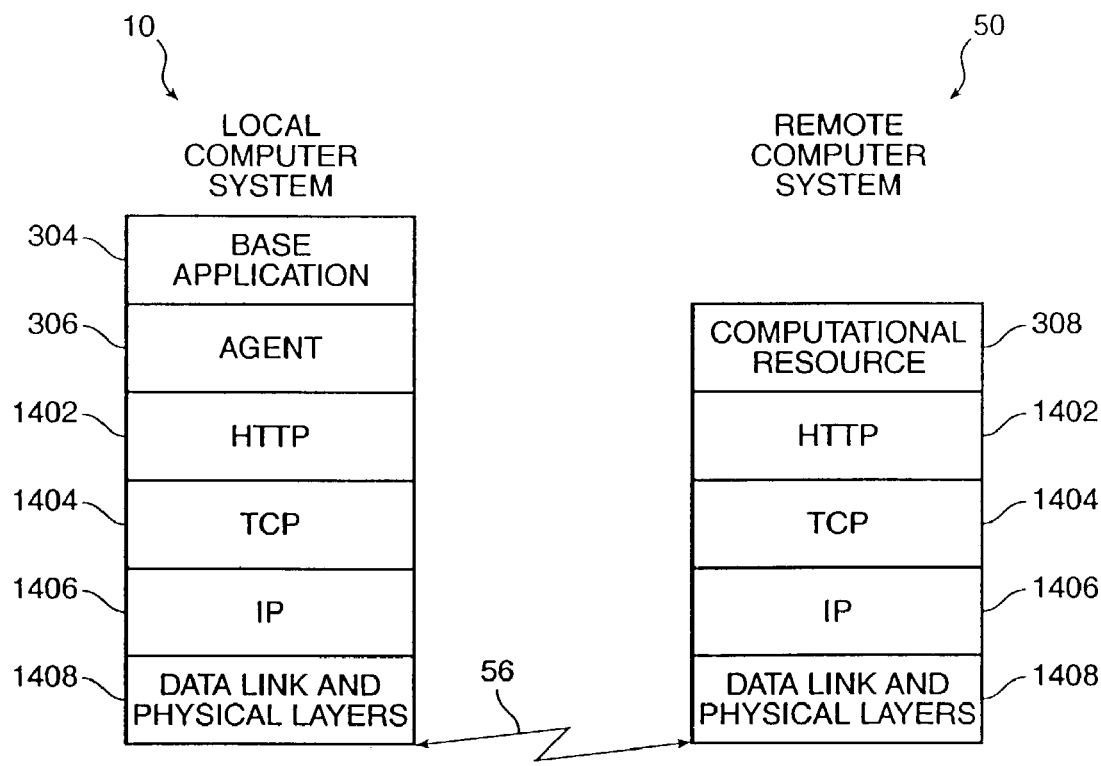
FIG. 13 is a diagram representing how a computational resource, a base application, and an agent may be distributed across multiple computer systems in a network.

In accordance with one embodiment of the present invention, one or more of base application 304, agent 306, and computational resource 308 are located on a remote computer system different than the one operated by user 302. FIG. 13 is a diagram representing how base application 304 and agent 306 may be located at local computer system 10 operated by user 302 while computational resource 308 may be located at a remote computer system such as remote computer system 50. Local computer system 10 includes various protocol entities to communicate over Internet 56, or some other network.

As in FIG. 13, agent 306 monitors interactions between user 302 of FIG. 3 and base application 304. In one embodiment, queries and instructions to computational resource 308 are sent in the form of HTTP messages to computational resource 308. Information resulting from the operation of computational resource 308 is returned in the form of HTTP messages. To accommodate this type of operation, both local computer system 10 and remote computer system 50 include an HTTP entity 1402. Other protocol entities including a TCP entity 1404, an IP entity 1406, and data link and physical layers 1408 operate under HTTP entity 1402. The operation of the layers below HTTP entity 1402 is explained in Black, TCP/IP & Related Protocols, (2nd Ed. 1994 McGraw-Hill), the contents of which are herein incorporated by reference. Of course, the present invention is not limited to any particular combination of network protocols.

Base application 304 could be a spreadsheet, word processor, or documentation browser program. Agent 306 then monitors user interactions to be used to generate query information or instructions for computational resource 308. This dynamically generated information is then passed on to the computational resources via the various inter-network communication protocols. Computational resource 308 may be a sophisticated search engine capable of searching Internet web sites and/or news groups on other remote computer systems. For example, as the user works in a spreadsheet application, agent 306 computes a context-sensitive instruction to computational resource 308, which responds by identifying and retrieving supplementary information to complete calculations in the current spreadsheet returning it to agent 306 for presentation to user 302. Another example is that if the user is working in a word processor, agent 306 could request additional help documents from computational resource 308.

It should be noted that HTTP is not the only protocol usable to access an external computational resource. For example, if computational resource 308 is a news server, an NNTP protocol entity may be employed as known to those of skill in the art. Messages may be passed using TCP in conjunction with DDE without using HTTP. If computational resource 308 is a ".DLL" file, the DLL protocol may be used to access it in conjunction with HTTP or directly with TCP. Also, agent 306 may access multiple instances of computational resource 308 located at various remote systems. Agent 306 thus may itself perform a searching function in finding the best computational resources.

In an alternative embodiment, all or a portion of agent 306 is located on a remote computer system and the user interactions between user 302 and base application 304 are passed to agent 306 over a network. Base application 304 may itself incorporate a web browser and agent 306 may monitor interactions with the web site. Computational resource 308 may be at the same location as agent 306 or at another remote computer system.

Figure 14:
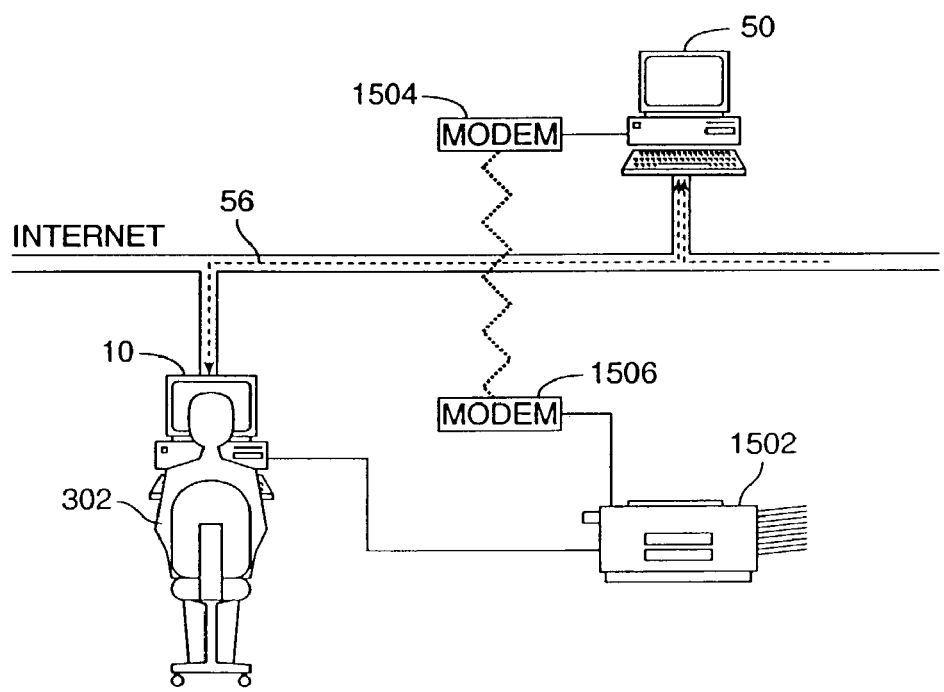
FIG. 14 is a diagram representing how a computational resource may perform remote testing of an apparatus being diagnosed by a user in accordance with one embodiment of the present invention.

FIG. 14 is a diagram representing how a computational resource may perform remote testing of an apparatus being diagnosed by a user in accordance with one embodiment of the present invention. User 302 operates local computer system 10 to diagnose an apparatus much as a copier 1502. Base application 304 of FIG. 3, here preferably an expert system, and agent 306 operate on local computer system 10. Computational resource 308 of FIG. 3 operates on remote computer system 50. Agent 306 FIG. 3 and computational resource 308 exchange information via the Internet 56.

Remote computer system 50 is further equipped with a modem 1504 in addition to its own network interface 48 of FIG. 1. Copier 1502 also incorporates a modem 1506 and internal circuitry to collect and store information on copier operation and status. In response to a query or instruction from agent 306 on local computer system 10, computational resource 308 activates modem 1504 to call modem 1506 and retrieve information about the status and configuration of copier 1502. Computational resource 308 may return this information directly to agent 306. Agent 306 may also send instructions or queries another computational resource that acts as an on-line technical documentation resource having information regarding the user's session. Agent 306 may contact yet another computational resource which searches the Internet for information relating the condition of copier 1502. In this way, information particular to the configuration and/or condition of copier 1502 may be collected from other users who have experienced similar problems.

An information retrieval system which operates in parallel with a probabilistic expert system has been disclosed as a specific example. The system has provided query-free technical documentation as an "automatic" side-effect of a diagnostic session. The system derives its search goals from the information embedded in the expert system. Thus, the system of the present invention takes advantage of an expert's knowledge in two ways: as the primary source for constructing a knowledge base, and as a provider of contextually sensitive node labels which can later be used to search technical documentation. As experts become more and more familiar with the documentation and its creation, particularly if standard methods of expression are used, the experts can provide better descriptive labels for the expert system nodes, which in turn become search patterns, thus increasing the likelihood of retrieval success. These characteristics, which provide simple solutions yet exhibit high quality results, provide an improved system for information retrieval.

The above description of the preferred embodiment has been made to explain the invention. Although particular examples such as repair of a photocopy machine have been described, it should be appreciated these examples are only for illustration and explanation. The scope of the invention is defined by the following claims and their full scope of equivalents.

What is claimed is:

1. A method performed by one or more computer systems of retrieving information for a user interacting with one or more applications associated with the set of one or more computer systems, the method comprising:
   receiving a selection signal from one or more user input devices, the selection signal indicative of a user selection made with a first application executing on a first computer system;
   determining contextual information indicative of a context for the user selection made with the first application based upon the selection signal from the one or more user input devices;
   constructing an information request by a first set of the one or more computer systems for information that is relevant to the context; and
   receiving first information that is relevant to the context in response to the information request, the first information generated by a second set of the one or more computer systems in response to the information request using a computational resource.

2. The method of claim 1 wherein the computational resource is operating on a second computer system, the method further comprising communicating the information request from the first computer system to the second computer system.

3. The method of claim 1 wherein the computational resource is operating on the first computer system.

4. The method of claim 1 further comprising displaying the first information that is relevant to the context.

5. The method of claim 4 wherein displaying the first information that is relevant to the determined context comprises displaying the first information via the first application.

6. The method of claim 1 wherein:
   receiving the selection signal from the one or more user input devices comprises receiving information identifying a symptom related to an apparatus; and
   receiving the first information comprises receiving information identifying one or more faults in the apparatus corresponding to the symptom.

7. The method of claim 6 wherein the computational resource comprises a document comprising information for the apparatus.

8. The method of claim 6 wherein the apparatus is a photocopier.

9. The method of claim 6 further comprising:
   displaying, for at least one fault from the one or more faults, information identifying the at least one fault; and
   displaying information indicating a degree of likelihood that the symptom is caused by the at least one fault.

10. A computer-implemented method performed by a set of one or more computer systems of retrieving information for a user interacting with one more applications associated with the set of one of the one or more computer systems, the method comprising:
    receiving user interaction information from a user interface indicative of one or more user interactions made with a first application executing on a first computer system;
    determining contextual information indicative of a context for the one or more user interactions made with the first application based upon the user interaction information received from the user interface;
    constructing an instruction by a first set of the one or more computer systems based upon the contextual information;
    executing the instruction to determine first information that is relevant to the determined context, wherein the first information is determined at a second set of the one or more computer systems using a computational resource; and
    displaying the first information using a display device.

11. A computer program product stored on a computer-readable storage medium and operational with a set of one or more computer systems for retrieving information for a user interacting with one more applications associated with the set of one or more computer systems, the computer program product comprising:
    code for receiving a selection signal from one or more user input devices, the selection signal indicative of a user selection made with a first application executing on a first computer system;
    code for determining contextual information indicative of a context for the user selection made with the first application based upon the selection signal from the one or more user input devices;
    code for constructing an information request by a first set of the one or more computer systems for information that is relevant to the context; and
    code for receiving first information that is relevant to the context in response to the information request, the first information generated by a second set of the one or more computer systems in response to the information request using a computational resource.

12. The computer program product of claim 11 wherein the computational resource is operating on a second computer system, the computer program product further comprising code for communicating the information request from the first computer system to the second computer system.

13. The computer program product of claim 11 wherein the computational resource is operating on the first computer system.

14. The computer program product of claim 11 further comprising code for displaying the first information that is relevant to the context.

15. The computer program product of claim 14 wherein the code for displaying the first information that is relevant to the context comprises code for displaying the first information via the first application.

16. The computer program product of claim 11 wherein:
the code for receiving the selection signal from the one or more user input devices comprises code for receiving information identifying a symptom related to an apparatus; and
the code for receiving the first information comprises code for receiving information identifying one or more faults in the apparatus corresponding to the symptom.

17. The computer program product of claim 16 wherein the computational resource comprises a document comprising information for the apparatus.

18. The computer program product of claim 16 wherein the apparatus is a photocopier.

19. The computer program product of claim 16 further comprising:
code for displaying, for at least one fault from the one or more faults, information identifying the at least one fault; and
code for displaying information indicating a degree of likelihood that the symptom is caused by the at least one fault.

20. A computer program product stored on a computer-readable storage medium and operational with a set of one or more computer systems for retrieving information for a user interacting with one or more applications associated with the one or more computer systems, the computer program product comprising:
code for receiving user interaction information from a user interface, the user interaction information indicative of one or more user interactions with a first application executing on a computer system;
code for determining contextual information indicative of a context for the one or more user interactions with the first application based upon the user interaction information received from the user interface;
code for constructing an instruction by a first set of one or more computer systems based upon the contextual information;
code for executing the instruction to determine first information that is relevant to the context, wherein the first information is determined at a second set of one or more computer systems using a computational resource; and
code for displaying the first information via the first application using a display device.

21. A data processing system comprising:
a processor; and
a memory coupled to the processor, the memory configured to store a plurality of instructions executable by the processor, the plurality of instructions comprising:
instructions for receiving a selection signal from one or more user input devices, the selection signal indicative of a user selection made with a first application executing on a computer system;
instructions for receiving contextual information based upon the selection signal from the one or more user input devices;
instructions for constructing a request from the contextual information; and
instructions for receiving first information that is relevant to a context established by the contextual information for the user selection in response to the request, the first information generated in response to the request using a computational resource.

22. The data processing apparatus of claim 21 wherein the instructions for constructing the request comprises instructions for generating the request automatically from the contextual information without direct intervention from the user.

* * * * *

UNITED STATES PATENT AND TRADEMARK OFFICE
CERTIFICATE OF CORRECTION

PATENT NO.           : 7,734,563 B2                                    Page 1 of 1
APPLICATION NO.  : 10/462017
DATED                    : June 8, 2010
INVENTOR(S)         : Peter Hart et al.

It is certified that error appears in the above-identified patent and that said Letters Patent is hereby corrected as shown below:

In the Claims:

Col. 13, claim 1, Line 40, after "determining," please insert -- conditionally probabilistic --

Col. 13, claim 1, Line 49, after "generated by a," please insert -- Bayesian network on a --

Col. 14, claim 10, Line 22, after "determining," please insert -- conditionally probabilistic --

Col. 14, claim 10, Line 31, after "determined at a," please insert -- Bayesian network on a --

Col. 14, claim 11, Line 45, after "determining," please insert -- conditionally probabilistic --

Col. 14, claim 11, Line 54, after "generated by a," please insert -- Bayesian network on a --

Col. 15, claim 20, Line 36, after "determining," please insert -- conditionally probabilistic --

Col. 16, claim 20, Line 8, after "determined at a," please insert -- Bayesian network on a --

Col. 16, claim 21, Line 22, after "receiving," please insert -- conditionally probabilistic --

Col. 16, claim 21, Line 26, after "information," please insert -- using a Bayesian network --

Signed and Sealed this

Twenty-fourth Day of August, 2010

David J. Kappos
*Director of the United States Patent and Trademark Office*